United States Patent
Sugie

(10) Patent No.: US 8,190,005 B2
(45) Date of Patent: May 29, 2012

(54) MOTOR DRIVING CIRCUIT AND LOAD DRIVING APPARATUS WITH PULSE WIDTH MODULATION

(75) Inventor: Hisashi Sugie, Kyoto (JP)

(73) Assignee: Rohm Co., Ltd. (JP)

( * ) Notice: Subject to any disclaimer, the term of this patent is extended or adjusted under 35 U.S.C. 154(b) by 589 days.

(21) Appl. No.: 12/440,840

(22) PCT Filed: Sep. 3, 2007

(86) PCT No.: PCT/JP2007/000950
§ 371 (c)(1),
(2), (4) Date: Mar. 11, 2009

(87) PCT Pub. No.: WO2008/032435
PCT Pub. Date: Mar. 20, 2008

(65) Prior Publication Data
US 2009/0284197 A1   Nov. 19, 2009

(30) Foreign Application Priority Data
Sep. 11, 2006 (JP) .................................. 2006-246102

(51) Int. Cl.
*H02P 7/29* (2006.01)
(52) U.S. Cl. .......................... 388/811; 318/599; 318/811
(58) Field of Classification Search .................. 318/560, 318/599, 400.01, 811, 721, 779, 799, 280, 318/400.07, 466, 701; 388/811, 819, 831, 388/804
See application file for complete search history.

(56) References Cited

U.S. PATENT DOCUMENTS

| | | | | |
|---|---|---|---|---|
| 5,463,298 A * | 10/1995 | Kamio et al. | ................. | 318/599 |
| 5,831,403 A * | 11/1998 | Kanki et al. | ................. | 318/286 |
| 6,483,270 B1 * | 11/2002 | Miyazaki et al. | ............. | 318/700 |
| 6,986,688 B1 * | 1/2006 | Jansen | ................. | 440/1 |
| 7,086,496 B2 * | 8/2006 | Kodama | ................. | 180/446 |
| 2004/0232872 A1 * | 11/2004 | Sunaga et al. | ................. | 318/652 |
| 2006/0126461 A1 * | 6/2006 | Wada | ................. | 369/47.4 |

FOREIGN PATENT DOCUMENTS

| | | |
|---|---|---|
| JP | 3-218286 A | 9/1991 |
| JP | 5-207774 A | 8/1993 |
| JP | 6-30589 A | 2/1994 |

OTHER PUBLICATIONS

PCT International Preliminary Report on Patentability for International Application No. PCT/JP2007/000950 issued Mar. 17, 2009 with English translation.
International Search Report for International Application No. PCT/JP2007/000950 mailed Sep. 25, 2007 with English translation.

* cited by examiner

*Primary Examiner* — Walter Benson
*Assistant Examiner* — Antony M Paul
(74) *Attorney, Agent, or Firm* — Cantor Colburn LLP

(57) ABSTRACT

When the bit number of an error signal ERR2 is n and the magnitude of the error signal ERR2 is "a" (a is an integer) in decimal notation, a pulse-width modulator generates a PWM signal Spwm as a set of k (k is an integer of 2 or more) continuous sub-pulses. Further, the pulse-width modulator generates k sub-pulses in such a manner that the average value of the duty ratios of the sub-pulses becomes approximately $a/2^n$.

10 Claims, 3 Drawing Sheets

MOTOR DRIVING CIRCUIT AND LOAD DRIVING APPARATUS WITH PULSE WIDTH MODULATION

CROSS REFERENCE TO RELATED APPLICATIONS

This is a U.S. national stage of application No. PCT/JP2007/000950, filed on 3 Sep. 2007. Priority under 35 U.S.C. §119(a) and 35 U.S.C. §365(b) is claimed from Japanese Application No. 2006-246102, filed 11 Sep. 2006, the disclosure of which is also incorporated herein by reference.

BACKGROUND OF THE INVENTION

1. Field of the Invention

The present invention relates to a load driving technique, and particularly to a load driving technique on the basis of a pulse signal whose duty ratio is changed.

2. Description of the Related Art

To drive a DC (direct current) motor or a spindle motor with a desired revolution, a motor driving apparatus monitors the revolution of the motor and produces a driving signal on the basis of the deviation from a desired target value. The motor driving apparatus that controls a motor as described above may employ a speed discriminator disclosed in the Patent Document 1, for example.

Some of the speed discriminators compare a current revolution of the motor and a revolution that is a desired target value, and outputs an error signal according to the deviation as a digital value. This error signal produces a pulse-width modulation signal having a duty ratio according to the digital value of the error signal after a high-frequency component of the error signal is eliminated with the use of a low-pass digital filter. And the error signal feedback-controls the time for energizing the motor, on the basis of the pulse-width modulation signal, so as to stabilize the revolution at the target value.

[Patent Document 1] Japanese Patent Application (Laid-Open) No. H06-30589

For example, the duty ratio of the pulse-width modulation signal is set by counting a clock signal in such a manner that the duty ratio becomes 100% when a digital error signal has a maximum value, and the duty ratio becomes 0% when the error signal has a minimum value. It is supposed, for example, that the error signal is n bit and its value is "a" in decimal notation. In this case, supposing that the cycle of the clock signal is Tck, the cycle of the pulse-width modulation signal is set to $2^n \times Tck$, and its ON-period is set by counting the clock signal Tck $2^a$ times.

On the other hand, there is a demand that the cycle of the pulse-width modulation signal is shortened from the viewpoint of driving efficiency in the motor driving circuit. However, when the pulse-width modulation signal is generated by utilizing the clock signal with the aforesaid method, it is necessary that the cycle of the clock signal is reduced and therefore the frequency of the clock signal is set to be high in order to shorten the cycle of the pulse-width modulation signal. When the clock signal having high frequency is generated, however, a problem arises that the affect of the clock signal as a noise increases. Further, it is difficult to generate the clock signal having high frequency in the motor driving circuit due to the restriction of a circuit area or the like. Providing an oscillator at the outside might bring increased cost.

SUMMARY OF THE INVENTION

The present invention is accomplished in view of the foregoing problem, and one of its general purposes is to provide a technique for generating a pulse signal having a short cycle while suppressing the increase in a frequency of a clock signal.

One embodiment of the present invention relates to a motor driving circuit that receives an error signal having a digital value, which indicates a deviation between a current driving state of a motor to be driven and its target driving state, so as to drive the motor. This motor driving circuit includes a pulse modulator that generates a pulse signal, having a duty ratio in accordance with the error signal, by utilizing an input clock signal, and a switching circuit that controls the energization state of the motor on the basis of the pulse signal output from the pulse modulator. The pulse modulator generates the pulse signal as a set of k (k is an integer of 2 or more) continuous sub-pulses, and determines the average value of the duty ratios of k sub-pulses on the basis of the error signal.

According to this embodiment, a plurality of k sub-pulses are generated with respect to the value of one error signal, and the average value of the duty ratios of the sub-pulses is set in accordance with the error signal. Therefore, the apparent cycle of the pulse signal can be reduced by a factor of k, compared to the case in which one pulse is generated for one error signal.

When the bit number of the error signal is n (n is a natural number) and the magnitude of the error signal is a (a is an integer) in decimal notation, the pulse modulator may generate k sub-pulses in such a manner that the average value of the duty ratios of the sub-pulses becomes $a/2^n$.

The equation of $k=2^m$ (m is a natural number satisfying m<n) may be established. In this case, the consistency with the digital signal processing utilizing binary notation can be enhanced, whereby the circuit can be simplified.

In one embodiment, the pulse modulator may generate k sub-pulses such that each of the k ($=2^m$) sub-pulses has a cycle $2^{(n-m)}$ times the cycle of the clock signal, and that the total of the ON-periods of k sub-pulses is a times the cycle of the clock signal.

When the value of the low-order m-bit of the error signal is b (b is an integer) in decimal notation, and the value obtained by shifting the error signal in the direction of a low-order bit by m bits is c (c is an integer) in decimal notation, the pulse modulator may set the ON-periods of b sub-pulses, among k($=2^m$) sub-pulses, by counting the clock signal (c+1) times, and set the ON-periods of the remaining (k−b) sub-pulses by counting the clock signal c times.

In one embodiment, the error signal may be a signal according to an output from a speed discriminator that outputs a digital signal according to a frequency deviation between the output signal from a speed sensor, which detects the revolution of the motor, and a clock signal in accordance with the target revolution.

The motor driving circuit may be monolithically integrated on a single semiconductor substrate. The term "monolithically integrated" includes the case in which all the components of a circuit are formed on the semiconductor substrate and the case in which the main components of a circuit are monolithically integrated, wherein some resistors or capacitors may be provided at the outside of the semiconductor substrate for adjusting a circuit constant. These circuits are integrated as a single LSI, whereby the circuit area can be reduced.

Another embodiment of the present invention relates to a motor driving apparatus. This motor driving apparatus includes a speed sensor that generates a speed signal having a frequency according to a revolution of a motor to be driven, a clock signal generating unit that generates a reference clock signal having a frequency according to a target value of the revolution of the motor, a speed discriminator that receives the speed signal output from the speed sensor and the reference clock signal and outputs an error signal having a digital value according to the frequency deviation between two signals, and the motor driving circuit according to any one of the aforesaid embodiments that drives the motor on the basis of the error signal output from the speed discriminator.

In this case, the apparent frequency of the pulse signal can be increased while suppressing the frequency of the clock signal that is for generating the pulse signal, whereby the driving efficiency of the motor can be improved.

Still another embodiment of the present invention is an electronic apparatus. This electronic apparatus includes a motor, the aforesaid motor driving apparatus that drives the motor, and a movable unit whose position is changed by the motor.

Still another embodiment of the present invention is a load driving apparatus that drives a load on the basis of an input digital signal. This load driving apparatus includes a pulse modulator that generates a pulse signal having a duty ratio according to the input digital signal, and a driving unit that performs a switching control on the load on the basis of the pulse signal output from the pulse modulator. When the bit number of the digital signal is n, and its magnitude is "a" in decimal notation, the pulse modulator generates the pulse signal as a set of k (k is an integer of 2 or more) continuous sub-pulses, and generates the k sub-pulses in such a manner that the average value of the duty ratios of k sub-pulses becomes approximately $a/2^n$.

According to this embodiment, the driving frequency of the load can be increased without increasing the frequency of the clock signal used for generating the pulse signal. There might be the case in which the average value of the duty ratios cannot be set to just $a/2^n$ due to the bit number. However, in this case, the driving frequency can be increased by setting the average value of the duty ratios to be "approximately" $a/2^n$.

Still another embodiment of the present invention relates to a pulse modulation method for generating a pulse signal having a duty ratio according to an input digital signal by counting a clock signal. When the bit number of the digital signal is n, its low-order m-bit (m is a natural number satisfying m<n) is x (x is an integer) in decimal notation, and the value obtained by shifting the digital signal in the direction of a low-order bit by m bits is y (y is an integer) in decimal notation, this method includes generating continuous $2^m$ sub-pulses; setting the ON-periods of y sub-pulses among $2^m$ sub-pulses by counting the clock signal (x+1) times, and setting the OFF-periods of y sub-pulses by counting the clock signal ($2^n-(x+1)$) times; and setting the ON-periods of the remaining ($2^m-y$) sub-pulses by counting the clock signal x times and setting the OFF-periods of the remaining ($2^m-y$) sub-pulses by counting the clock signal ($2^n-x$) times.

According to this embodiment, a pulse signal having a high frequency, that is, having a short cycle, can be obtained without increasing the frequency of the clock signal.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
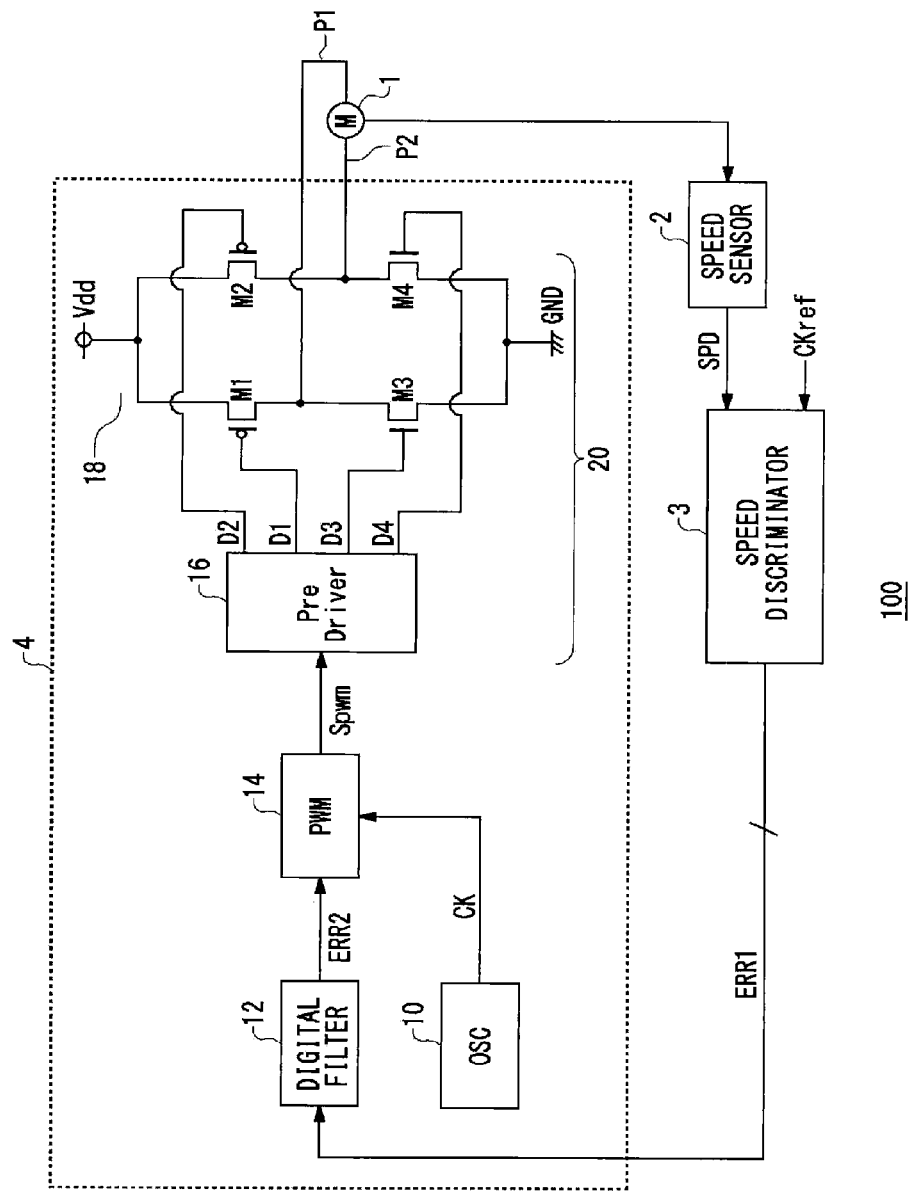
FIG. 1 is a block diagram showing a configuration of a motor driving apparatus according to the present embodiment.

FIG. 1 is a block diagram showing a configuration of a motor driving apparatus 100 according to an embodiment. FIG. 1 shows a motor 1, which is a subject to be driven, together with the motor driving apparatus 100. The motor 1 and the motor driving apparatus 100 are mounted to an electronic apparatus having a movable unit. The motor 1 is connected to the movable unit of the electronic apparatus. The revolution of the motor 1 is controlled by the motor driving apparatus 100, whereby the motor 1 operates the movable unit. For example, the electronic apparatuses include a digital still camera or digital video camera, wherein the motor 1 is utilized for moving a lens or shutter.

The motor driving apparatus 100 drives the motor in such a manner that the revolution thereof approaches a desired target value, while monitoring the revolution of the motor 1. The amount monitored by the motor driving apparatus 100 may not be a revolution but may be a torque. In this case, the electric current flowing through a coil of the motor is monitored. The motor driving apparatus 100 has a speed sensor 2, speed discriminator 3, and motor driving circuit 4.

The speed sensor 2 detects the revolution of the motor 1, which is a subject to be driven, and outputs the speed information of the motor 1 as a speed signal SPD. For example, the speed sensor 2 may detect the current flowing through the motor 1, and convert the detected current into the speed information. Alternatively, the speed sensor 2 may perform the detection of the speed with the use of a Hall element. In the present embodiment, the speed signal SPD is a periodic signal having a frequency proportional to the revolution of the motor 1.

The speed discriminator 3 receives the speed signal SPD, which is an output signal of the motor 1, and a reference clock signal CKref having a frequency according to the target value of the revolution of the motor. The reference clock signal CKref is supplied from a clock signal generating unit not shown. The speed discriminator 3 compares the frequency of the reference clock signal CKref and the frequency of the speed signal SPD so as to output an error signal ERR1 having the digital value according to the deviation of the frequencies of two signals. Therefore, the digital value of the error signal ERR1 increases as the difference between the current revolution of the motor 1 and the target value increases. The error signal ERR1 produced by the speed discriminator 3 is output to the motor driving circuit 4.

The motor driving circuit 4 drives the motor 1 on the basis of the error signal ERR1 output from the speed discriminator 3. The motor driving circuit 4 has an oscillator 10, digital filter 12, pulse-width modulator 14, pre-driver 16, and H-bridge circuit 18, and the motor driving circuit 4 is composed as a functional IC (Integrated Circuit) on one semiconductor substrate.

The digital filter 12 is a low-pass filter that eliminates the high-frequency component of the error signal ERR1, which is output from the speed discriminator 3. The error signal ERR2 from which the high-frequency component is eliminated is output to the pulse-width modulator 14. In the present embodiment, the structure of the digital filter 12 is not particularly limited. The digital filter 12 may be formed in IIR (Infinite Impulse Response) type, or FIR (Finite Impulse Response) type, or hybrid type of these types.

The oscillator 10 generates a clock signal CK having a predetermined frequency, and outputs the resultant to the pulse-width modulator 14. The pulse-width modulator 14 counts the clock signal CK so as to output a pulse-width modulation signal (hereinafter referred to as PWM signal) Spwm having a duty ratio according to the value of the error signal ERR2.

The pre-driver 16 and the H-bridge circuit 18 function as a switching circuit 20 that controls the energization state of the motor 1 on the basis of the PWM signal Spwm generated by the pulse-width modulator 14. The pre-driver 16 produces driving signals D1 to D4 on the basis of the pulse-width modulation signal Spwm, and supplies them to the H-bridge circuit 18 at the following stage. The pre-driver 16 turns on a pair of switching transistors M1 and M4 or a pair of M2 and M3 during ON-period corresponding to the high-level or low-level of the pulse-width modulation signal Spwm. Accordingly, the motor 1 is driven with a great torque to rotate with high revolution, as the ON-period of the pulse-width modulation signal Spwm is long.

The H-bridge circuit 18 is a switching circuit that alternately supplies either one of a power supply voltage Vdd and ground voltage GND to both ends of a coil of the motor 1, which is a subject to be driven. The H-bridge circuit 18 includes first to fourth switching transistors M1 to M4.

The first switching transistor M1 is a P-channel MOSFET (Metal Oxide Semiconductor Field Effect Transistor), and the third switching transistor M3 is an N-channel MOSFET. They are serially connected between a power supply line to which the power supply voltage Vdd is supplied and the ground. The voltage Vsw1 at the connection point of the first switching transistor M1 and the third switching transistor M3 is supplied to a terminal P1 of the motor 1.

Similarly, the second switching transistor M2 and the fourth switching transistor M4 are serially connected between the power supply line and the ground, and the voltage Vsw2 at the connection point of two transistors is supplied to a terminal P2 of the motor 1.

The ON/OFF states of the first to fourth switching transistors M1 to M4 are controlled by the driving signals D1 to D4 produced by the pre-driver 16. Specifically, the driving phase is determined, that is, it is determined which one of pair of the switching transistors M1 and M4 and the pair of the switching transistors M2 and M3 is driven, in accordance with the position of the rotor of the motor 1. Further, in the driven pair, the high-side switching transistor M1 (or M2) is fixedly turned ON and the low-side switching transistor M4 (or M3) is turned ON or OFF according to the duty ratio of the pulse-width modulation signal Spwm.

As described above, the path of the motor 1, speed sensor 2, speed discriminator 3, digital filter 12, pulse-width modulator 14, pre-drive 16, and H-bridge circuit 18 forms a feedback loop in the motor driving apparatus 100 in FIG. 1, wherein, by the feedback, the duty ratio of the PWM signal Spwm is adjusted such that the revolution of the motor 1 approaches the target value.

The motor driving apparatus 100 according to the present embodiment is characterized in the method of generating the PWM signal Spwm by the pulse-width modulator 14. The method of generating the PWM signal Spwm will be explained in detail below.

In the present embodiment, the bit number of the error signal ERR2 input to the pulse-width modulator 14 is n (=8), and the duty ratio of the pulse signal Spwm generated by the pulse-width modulator 14 is set to 100%, which is the maximum value, when the error signal ERR2 is in its overflow state (that is, 256 in decimal notation), and is set to 0%, which is the minimum value, when the error signal ERR2 is [00000000] in binary notation (0 in decimal notation). If the bits indicating the overflow are included, the error signal ERR is a 9-bit signal. The pulse-width modulator 14 counts the clock signal CK so as to generate the PWM signal Spwm, whereby the cycle Tpwm of the PWM signal Spwm becomes $Tck \times 2^n = Tck \times 256$. The Tck is a cycle of the clock signal CK.

The pulse-width modulator 14 according to the present embodiment generates the PWM signal Spwm as a set of k (k is an integer of 2 or more) continuous sub-pulses having equal cycle. A plurality of sub-pulses are referred to as Ps1, Ps2, . . . , Pk below. Further, the pulse-width modulator 14 generates the k sub-pulses in such a manner that the average value of the duty ratios (hereinafter referred to as D1, D2, . . . , Dk) becomes approximately $a/2^n$.

Since the pulse-width modulator 14 is composed of a digital circuit in the present embodiment, it executes an internal signal processing with binary system. Therefore, it is desirable that k satisfies $k=2^m$ (m is a natural number satisfying m<n), that is, k is an exponentiation of 2. In the following explanation, the case of m=2, that is, the case in which the pulse-width modulator 14 generates (k=4) sub-pulses is described.

The pulse-width modulator 14 sets the cycles Ts of four (k=4) sub-pulses Sp1 to Sp4 to be equal to one anther and to be $=Tck \times 2^{(n-m)} = Tck \times 64$. Specifically, the relationship of Ts×k=Tpwm is established between the cycle Ts of the sub-pulse and the PWM signal Spwm.

Figure 2:
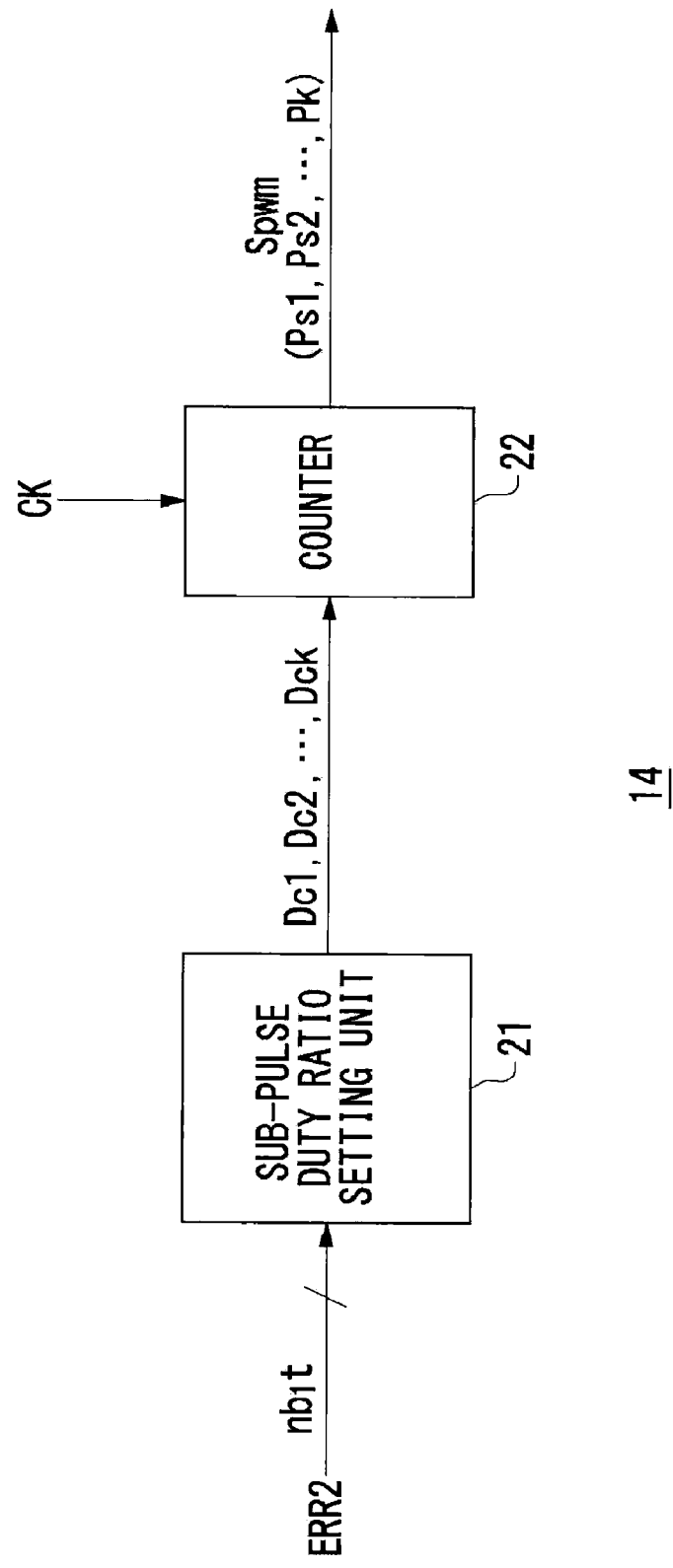
FIG. 2 is a view showing an example of a configuration of a pulse modulator according to the present embodiment.

FIG. 2 is a view showing an example of the configuration of the pulse-width modulator 14 according to the present embodiment. The pulse-width modulator 14 has a sub-pulse duty ratio setting unit 21, and a counter 22.

The error signal ERR2 is input to the sub-pulse duty ratio setting unit 21. It is supposed that the magnitude of the error signal ERR2 is a (a is an integer) in decimal notation. The sub-pulse duty ratio setting unit 21 sets the duty ratios DR1 to DR4 of the four (k=4) sub-pulses Sp1 to Sp4 on the basis of the value of the error signal ERR2. Duty ratio setting signals Dc1 to Dc4 output from the sub-pulse duty ratio setting unit 21 to the counter 22 are signals instructing the count number of the clock signal CK to counter 22.

The sub-pulse duty ratio setting unit 21 generally equally divides the value of a to the number of the sub-pulses that is four (k=4). For example, the sub-pulse duty ratio setting unit 21 divides the value a of the error signal ERR2 by 4 (k=4) and sets the resultant values to the duty ratio setting signals Dc1 to Dc4 of four sub-pulses.

For example, when the error signal ERR2 is [01000000], that is, a=64, the sub-pulse duty ratio setting unit 21 carries out the setting of Dc1=Dc2=Dc3=Dc4=16.

Further, for example, when the error signal ERR2 is [00000011], that is, a=3, the sub-pulse duty ratio setting unit 21 carries out the setting of Dc1=0, and Dc2=Dc3=Dc4=1. Specifically, when a is not a multiple of k, the remainder is equally allocated.

When the error signal ERR2 overflows to take the maximum value, that is, when a=256, the sub-pulse duty ratio setting unit 21 carries out the setting of Dc1=Dc2=Dc3=Dc4=64.

The calculation of the duty ratio setting signals Dc1 to Dc4 by the sub-pulse duty ratio setting unit 21 may be performed as described below.

Firstly, the value obtained by shifting the binary error signal ERR2 in the direction of a low-order bit by m=2 bits is set as the duty ratio setting signals Dc1 to Dc4. Shifting the error signal ERR2 in the direction of a low-order bit by m bits corresponds to the division of a by k ($=2^m$). The value obtained by shifting the error signal ERR2 in the direction of a low-order bit by m bits is assumed to be c (c is an integer) in decimal notation.

Next, the low-order m=2 bits of the error signal ERR2 are reflected on the duty ratio setting signals Dc1 to Dc4. The low-order m=2 bits of the binary error signal ERR2 corresponds to the remainder when the error signal ERR2 is divided by k ($=2^m$). When it is supposed that the low-order two bits of the error signal ERR2 are b (b is an integer) in decimal notation, 1 is added to b duty ratio setting signals of Dc1 to Dc4. For example, when the low-order 2 bits are 00 (b=0), the Dc1 to Dc4 are unchanged. When the low-order 2 bits are 01 (b=1), 1 is added to one of Dc1 to Dc4 (for example, Dc4). When the low-order 2 bits are 10 (b=2), 1 is added to two (for example, Dc3 and Dc4)) of Dc1 to Dc4. When the low-order 2 bits are 11 (b=3), 1 is added to three (for example, Dc2, Dc3, and Dc4) of Dc1 to Dc4.

The duty ratio setting signals Dc1 to Dc4 thus generated are output to the counter 22.

The counter 22 counts the clock signal CK in accordance with the duty ratio setting signals Dc1 to Dc4 so as to generate the sub-pulses Sp1 to Sp4. Specifically, the counter 22 sets the cycles Ts of the sub-pulses Sp1 to Sp4 by counting the clock signal $2^{(n-m)}$ times, and sets the period, among these cycles Ts, during when the clock signal is counted four times corresponding to the duty ratio setting signals Dc1 to Dc4 to the ON-periods of the sub-pulses Sp1 to Sp4.

Specifically, considering the method of setting the duty ratio setting signals Dc1 to Dc4, the counter 22 sets the ON-period of b sub-pulses of k ($=2^m$) sub-pulses by counting the clock signal (c+1) times, and sets the ON-period of the remaining (k−b) sub-pulses by counting the clock signal c times.

Figure 3:
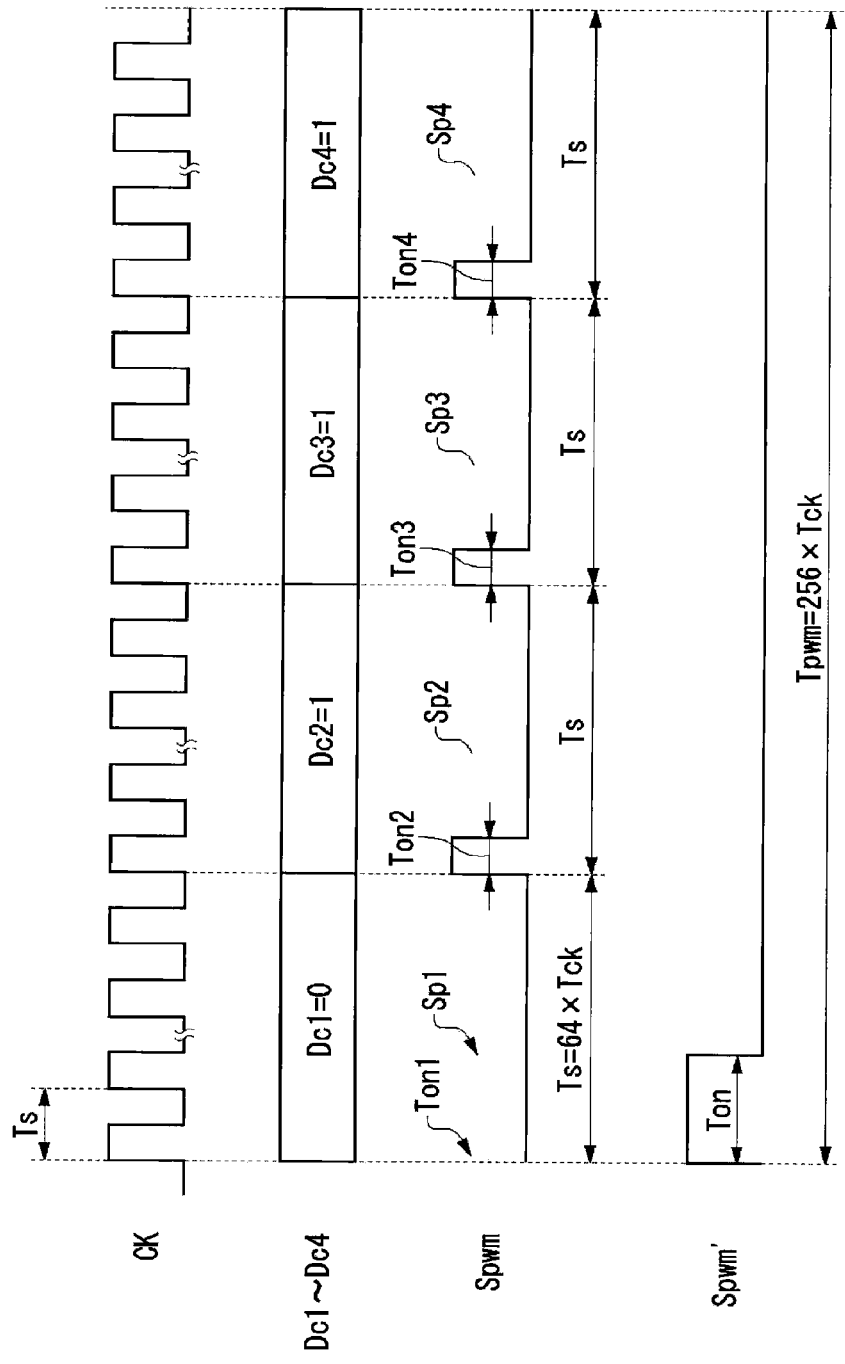
FIG. 3 is a time chart showing an operation state of the motor driving apparatus shown in FIG. 1.

The operation of the motor driving apparatus 100 thus configured will be explained. FIG. 3 is a time chart showing the operation state of the motor driving apparatus 100 shown in FIG. 1. In FIG. 3, the clock signal CK, the duty ratio setting signals Dc1 to Dc4, and the PWM signal Spwm are illustrated in this order from the top of the figure, and FIG. 3 shows the case in which the error signal ERR2 is 00000011 (a=3). The PWM signal Spwm' that is generated in a conventional motor driving apparatus is illustrated at the lowermost part of FIG. 3 for comparison.

When the error signal ERR2 is a=3, the sub-pulse duty ratio setting unit 21 makes the setting such as Dc1=0, and Dc2 to Dc4=1. The counter 22 successively generates the sub-pulses Sp1 to Sp4 by utilizing the duty ratio setting signals Dc1, Dc2, Dc3, and Dc4. Specifically, the ON-period of the ith sub-pulse Spi is set to Toni that is the period when the clock signal CK is counted Dci times during one cycle Ts when the clock signal CK is counted 64 times.

As a result, four sub-pulses Sp1 to Sp4 are output from the counter 22. In the example of FIG. 3, the duty ratio of the sub-pulse Sp1 is set to 0%, so that it has not pulse-like form. However, in this case, this sub-pulse is considered as one sub-pulse.

On the other hand, when the error signal ERR2 is a=3 in the conventional technique, the ON-period Ton becomes Tck×3 with 256×Tck defined as one cycle Tpwm as illustrated at the lowermost part of FIG. 3. Therefore, only one pulse appears during the cycle Tpwm. The relationship described below is established between the PWM signal Spwm according to the present embodiment and the conventional PWM signal Spwm'.

$Tpwm = Ts \times k$ $Ton = Ton1 + Ton2 + Ton3 + Ton4$ $DR = Ton/Tpwm = a/2^n$ $DR1 = Ton1/Ts, DR2 = Ton2/Ts, DR3 = Ton3/Ts,$
$DR4 = Ton4/Ts, AVE(DR1, DR2, DR3, DR4) = DR$ Here, AVE( ) indicates an average. Specifically, attention should be put on the fact that the duty ratio of the PWM signal Spwm in the present embodiment and the duty ratio DR of the conventional PWM signal Spwm' are set to be equal to each other.

According to the motor driving apparatus 100 of the present embodiment, a plurality of sub-pulses are generated for one error signal ERR2, whereby the apparent frequency of the PWM signal Spwm can be more increased than the conventional one without increasing the frequency of the clock signal CK.

Since the number k of the sub-pulses is set to the exponentiation of 2, the duty ratio setting signals Dc1 to Dc4 can easily be calculated by a bit-shift.

The aforesaid embodiment is only illustrative, and various modifications are possible for the combination of each component and each process. Further, it would be understood by a person skilled in the art that the modifications described above are included within the scope of the present invention.

The present embodiment describes, as a preferred embodiment, that the duty ratio setting signals Dc1 to Dck are calculated such that the duty ratios DR1 to DRk of k sub-pulses are generally equal to one another. However, the present invention provides an effect that the apparent frequency of the PWM signal can be increased even if the duty ratio is unequally allocated.

Although the cycles of the k sub-pulses are set to be the same in the present embodiment, the present invention is not limited thereto. For example, when the error signal ERR2 is 8-bit and its overflow is not considered, the cycle of the pulse signal Spwm becomes Tck×255. In this case, the cycles of the sub-pulses may be set to 63×Tck, 64×Tck, 64×Tck, and 64×Tck. Further, if the arithmetic capability of the pulse-width modulator 14 allows, the cycles of a plurality of sub-pulses may be set to totally different values.

The motor driving circuit 4 according to the present embodiment drives the motor 1 on the basis of the error signal ERR by the speed discriminator 3 corresponding to the frequency deviation between the revolution of the motor 1 and the reference clock signal Ckref. As the modification, the coil current of the motor 1 may be converted into a voltage, the error voltage between this voltage and the target voltage corresponding to the target torque of the motor may be subject to an analog/digital conversion to obtain a signal, and the obtained signal may be defined as the error signal.

The present embodiment describes the case in which a single-phase motor is driven by the H-bridge circuit. However, the present invention is also applicable to the generation of the PWM signal upon driving a multi-layer motor.

In the embodiments, all of the components constituting the motor driving circuit 4 may be monolithically integrated. Alternatively, the components constituting the motor driving circuit 4 may be formed in another integrated circuit, wherein a part thereof may be composed of discrete components. Which part is integrated may be determined according to the cost, occupied area or usage.

The application of the present invention is not limited to the PWM driving of the motor. The present invention can also be utilized for driving the other loads, such as an LED (Light Emitting Diode), switching regulator, inverter performing DC/AC conversion, or the like.

While the preferred embodiments of the present invention have been described using specific terms, such description is for illustrative purposes only, and it is to be understood that changes and variations may be made without departing from the spirit or scope of the appended claims.

What is claimed is:

1. A motor driving circuit that receives an error signal having a digital value, which indicates a deviation between a current driving state of a motor to be driven and its target driving state, so as to drive the motor, comprising:
    a pulse modulator that generates a pulse signal, having a duty ratio in accordance with the error signal, by utilizing an input clock signal; and
    a switching circuit that controls the energization state of the motor on the basis of the pulse signal output from the pulse modulator, wherein
    the pulse modulator generates the pulse signal as a set of k (k is an integer of 2 or more) continuous sub-pulses, and determines the average value of the duty ratios of k sub-pulses on the basis of the error signal, wherein
    the pulse modulator generates k sub-pulses in such a manner that the average value of the duty ratios of the sub-pulses becomes approximately $a/2^n$, when the bit number of the error signal is n (n is a natural number) and the magnitude of the error signal is a (a is an integer) in decimal notation.

2. A motor driving circuit according to claim 1, wherein the k satisfies the equation of $k=2^m$ (m is a natural number satisfying m<n).

3. A motor driving circuit according to claim 2, wherein the pulse modulator generates k sub-pulses such that each of the k ($=2^m$) sub-pulses has a cycle $2^{(n-m)}$ times the cycle of the clock signal, and that the total of the ON-periods of k sub-pulses is a times the cycle of the clock signal.

4. A motor driving circuit according to claim 3, wherein the pulse modulator sets the ON-periods of b sub-pulses, among k ($=2^m$) sub-pulses, by counting the clock signal (c+1) times, and
    sets the ON-periods of the remaining (k−b) sub-pulses by counting the clock signal c times,
    when the value of the low-order m-bit of the error signal is b (b is an integer) in decimal notation, and the value obtained by shifting the error signal in the direction of a low-order bit by m bits is c (c is an integer) in decimal notation.

5. A motor driving circuit according to claim 1, wherein the error signal is a signal according to an output from a speed discriminator that outputs a digital signal according to a frequency deviation between the output signal from a speed sensor, which detects the revolution of the motor, and a reference clock signal in accordance with the target revolution.

6. A motor driving circuit according to claim 1, which is monolithically integrated on a single semiconductor substrate.

7. A motor driving apparatus comprising:
    a speed sensor that generates a speed signal having a frequency according to a revolution of a motor to be driven;
    a clock signal generating unit that generates a reference clock signal having a frequency according to a target value of the revolution of the motor;
    a speed discriminator that receives the speed signal output from the speed sensor and the reference clock signal and outputs an error signal having a digital value according to the frequency deviation between two signals; and
    the motor driving circuit according to claim 2 that drives the motor on the basis of the error signal output from the speed discriminator.

8. An electronic apparatus comprising:
    a motor;
    the motor driving apparatus according to claim 7 that drives the motor; and
    a movable unit whose position is changed by the motor.

9. A load driving apparatus that drives a load on the basis of an input digital signal, comprising:
    a pulse modulator that generates a pulse signal having a duty ratio according to the input digital signal; and
    a driving unit that performs a switching control on the load on the basis of the pulse signal output from the pulse modulator, wherein
    when the bit number of the digital signal is n, and its magnitude is "a" in decimal notation, the pulse modulator generates the pulse signal as a set of k (k is an integer of 2 or more) continuous sub-pulses, and generates the k sub-pulses in such a manner that the average value of the duty ratios of k sub-pulses becomes approximately $a/2^n$.

10. A pulse modulation method for generating a pulse signal having a duty ratio according to an input digital signal by counting a clock signal, comprising:
    when the bit number of the digital signal is n, its low-order m-bit (m is a natural number satisfying m<n) is x (x is an integer) in decimal notation, and the value obtained by shifting the digital signal in the direction of a low-order bit by m bits is y (y is an integer) in decimal notation,
    generating continuous $2^m$ sub-pulses;
    setting the ON-periods of y sub-pulses among $2^m$ sub-pulses by counting the clock signal (x+1) times, and setting the OFF-periods of y sub-pulses by counting the clock signal ($2^n-(x+1)$) times; and
    setting the ON-periods of the remaining ($2^m-y$) sub-pulses by counting the clock signal x times and setting the OFF-periods of the remaining ($2^m-y$) sub-pulses by counting the clock signal ($2^n-x$) times.

* * * * *